United States Patent [19]

Woythal et al.

[11] 3,752,595
[45] Aug. 14, 1973

[54] ADAPTER FOR DRILL SPEEDER
[75] Inventors: Robert T. Woythal, West Allis; James L. Kirschnik, Brookfield, both of Wis.
[73] Assignee: Kearney & Trecker Corporation, West Allis, Wis.
[22] Filed: Mar. 31, 1971
[21] Appl. No.: 129,854

[52] U.S. Cl.............. 408/124, 90/11 A, 279/1 A, 279/1 TS, 408/238
[51] Int. Cl............................................ B23b 47/14
[58] Field of Search.......................... 408/124, 238; 279/1 A, 1 TS; 90/11 A

[56] References Cited
UNITED STATES PATENTS
2,844,968  7/1958  Schwab........................... 408/124 X
721,930  3/1903  Zellers.............................. 408/124
1,559,944  3/1925  Emrick............................. 408/124

Primary Examiner—Francis S. Husar
Attorney—Cyril M. Hajewski and Donald E. Porter

[57] ABSTRACT

A special adapter for receiving a drill speeder to enable the drill speeder to be handled by an automatic tool changer for insertion into and removal from a rotary spindle of a machine tool. The adapter provides for coupling the spindle of the machine tool to drive the drill speeder while retaining the outer housing of the drill speeder stationary without intervention by the machine tool operator.

12 Claims, 3 Drawing Figures

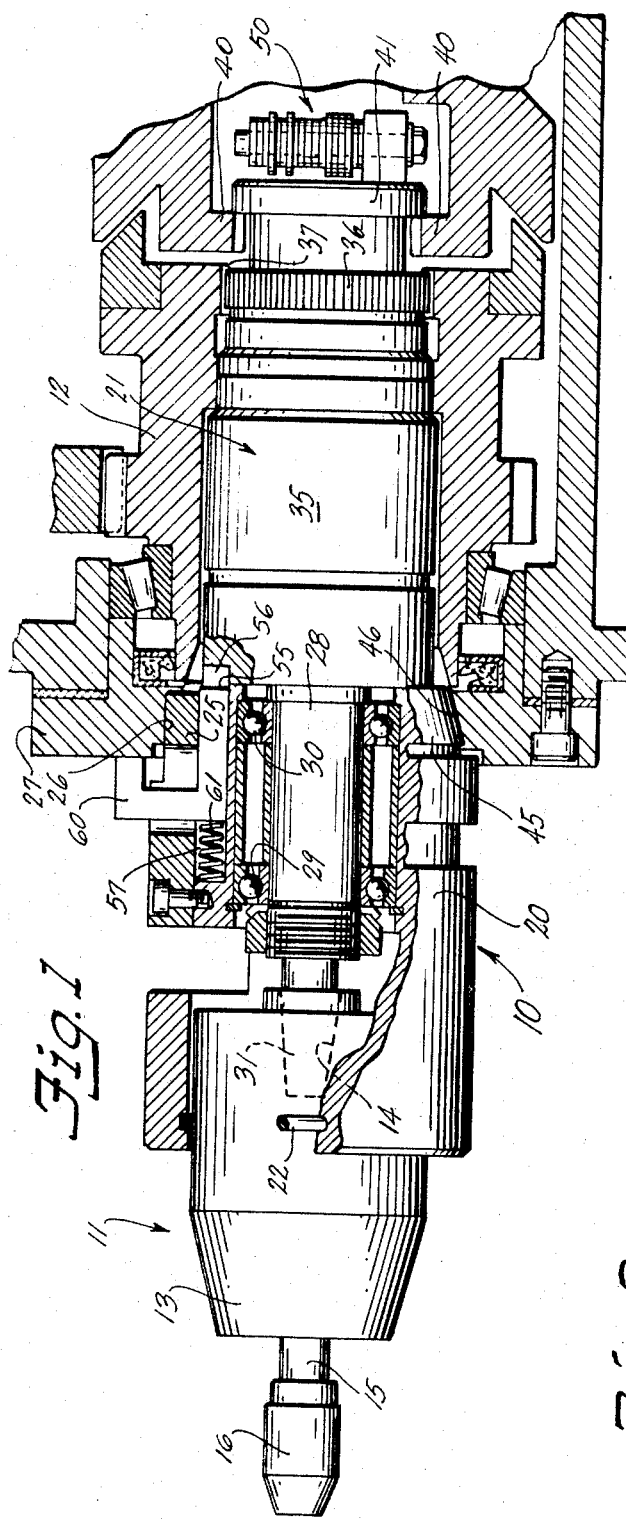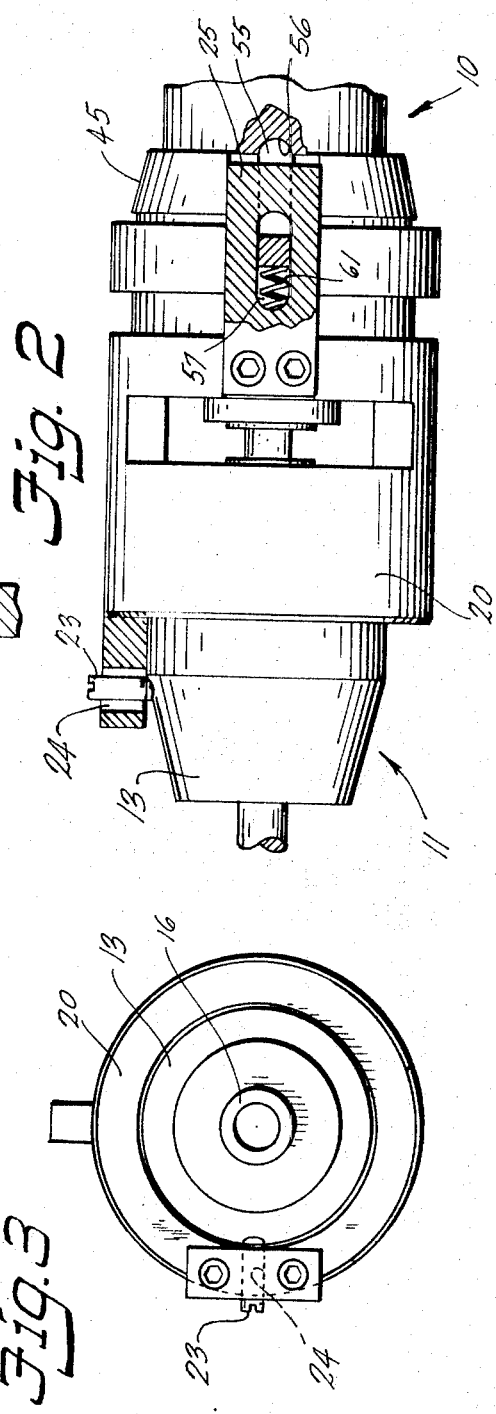

ADAPTER FOR DRILL SPEEDER

BACKGROUND OF THE INVENTION

The conventional drill speeder is adapted to be driven by a machine tool spindle for obtaining higher spindle speeds to expand the utility of the machine. The drill speeder includes a spindle and a drive mechanism enclosed in a housing. In operation, the drill speeder drive mechanism is coupled to be powered by the machine tool spindle while its housing is held stationary. The drive mechanism is arranged to rotate the drill speeder spindle at a much higher rate than the rate of rotation of its input.

The present invention is directed to providing an adapter to enable the conventional drill speeder to be handled by a tool change mechanism for automatically transferring the drill speeder between a tool storage magazine and the spindle. In order to accomplish this, it is necessary to fix the drill speeder housing against rotation while a driving connection is maintained between the machine tool spindle and the drill speeder drive mechanism. This must be achieved automatically without intervention by the machine tool operator.

Moreover, when employed with a tool change mechanism in which the tools in storage are identified by coding on the tools, it is necessary to provide such coding on the adapter for identification of the drill speeder, or the drill carried therein. It may also be necessary to obtain a specific orientation of the tool coding when it is stored in the magazine so that it is properly disposed for engagement with the cooperating reader which reads the coding for identifying the individual tools.

It is therefore a general object of the present invention to provide an adapter which will enable a conventional drill speeder to be transferred automatically by a tool change mechanism between a tool storage magazine and a rotary spindle of a machine tool.

It is a further object of the invention to provide an adapter for a drill speeder which includes a mechanism that is automatically engaged when the adapter and drill speeder are moved into the rotary spindle of a machine tool for rigidly retaining the fixed member of the drill speeder while the drive mechanism of the drill speeder is coupled to the machine tool spindle for rotating the drill speeder spindle at a relatively high rate.

Another object is to provide an adapter for a drill speeder which may be identified by suitable coding which will be orientated automatically for proper relationship with the reader that reads the coding.

SUMMARY

The adapter of the present invention comprises a hollow cylindrical forward portion which receives the outer housing of the drill speeder. The housing of the drill speeder is fixed to the cylindrical portion to prevent relative rotation. The cylindrical forward portion of the adapter is provided with a key, and when the adapter is moved into a keyway formed in the frame of the machine tool to rigidly secure the cylindrical portion of the adapter as well as the drill speeder housing.

Extending rearwardly of the cylindrical portion is a coupling member which is rotatable relative to the cylindrical portion and couples the drive mechanism of the drill speeder to the machine tool spindle to form a driving connection between these two elements when the adapter is in operating position in the machine.

In the illustrated embodiment, the adapter is provided with coding on the coupling member for identifying the unit in the storage magazine. In order to enable the coding to be read by its cooperating reading head in the magazine, the coding must be angularly orientated into a predetermined position to establish the required relationship with the reading head that is associated with the tool storage magazine. Accordingly, means are provided to lock the coupling member to the cylindrical portion of the adapter when the adapter is removed from the spindle to prevent relative rotation between these two members. When the adapter is inserted into the machine tool spindle, the lock is automatically released to permit the necessary rotation of the coupling member with the spindle relative to the hollow cylindrical portion of the adapter.

DESCRIPTION OF THE DRAWING

FIG. 1 is a view partly in side elevation and partly in cross section showing an adapter constructed in accordance with the present invention and supporting a drill speeder for actuation by the spindle of a machine tool;

FIG. 2 is a fragmentary plan view of the adapter illustrated in FIG. 1 with parts broken away to show the means for retaining the drill speeder in the adapter and for locking the cylindrical portion of the adapter to its coupling member for preventing relative rotation; and, FIG. 3 is a view in front elevation of the drill speeder assembled to the adapter as depicted in FIG. 1.

DESCRIPTION OF THE PREFERRED EMBODIMENT

Reference is now made more particularly to the drawings and specifically to FIG. 1 thereof which illustrates an adapter constructed in accordance with the teachings of the present invention. The adapter is generally identified by the reference numeral 10 and is provided for the purpose of supporting a conventional drill speeder generally identified by the reference numeral 11. The adapter 10 supports the drill speeder 11 so that the latter can be transferred by a tool change mechanism between a spindle 12 and a tool storage magazine (not shown). The adapter 10 and drill speeder 11 are assembled together and the entire unit is transferred by the tool change mechanism.

The drill speeder 11 functions to produce high spindle speeds for certain drilling or similar operations. It comprises a housing 13 which contains a drive mechanism (not shown) and includes an input 14 as well as a rotary spindle 15 which mounts the conventional type of chuck 16 for receiving a drill or other cutting tool. When mounted on the drill press, the input 14 is drivingly engaged with the drill press spindle and the spindle 15 will be driven at a rate substantially faster than the rate of rotation of the drill press spindle. For example, the drive mechanism of the drill speeder may increase the rate of rotation of its input six times. However, in order to accomplish this, the housing 13 must be held stationary. This may be done by manually holding the housing 13 stationary or by clamping it to the quill of the drill press. In the present invention, the housing 13 is held stationary with respect to the frame of the machine tool by the adapter 10.

The adapter 10 includes a hollow cylindrical forward portion 20 which serves as a support for the housing 13 of the drill speeder 11 and also rotatably supports a coupling member 21. The housing 13 of the drill speeder 11 is disposed within the bore of the cylindrical portion 20 and is centered therein by a flexible O-ring 22. It is prevented from rotating relative to the cylindrical portion 20 by a screw 23 disposed within a slot 24. The screw 23 extends through the slot 24 into threaded engagement with the housing 13. The width of the slot complements the diameter of the screw 23 to prevent any relative rotation between the housing 13 and the cylindrical portion 20. However, the slot 24 is elongated to accommodate for different positions of the screw 23 in a direction parallel to the axis of the drill speeder 11.

The cylindrical portion 20 of the adapter 10 is prevented from rotating relative to the frame of the machine by a key 25 disposed to enter a keyway 26 formed in the spindle face plate 27 which is rigidly mounted on the machine. When the tool change mechanism (not shown) transfers the adapter 10 with the drill speeder 11 into the spindle 12 of the machine tool, the key 25 enters the keyway 26 to secure the cylindrical portion 20 against rotation. Since the housing 13 is fixed with respect to the cylindrical portion 20 by means of the screw 23, the housing 13 is likewise prevented from rotating relative to the machine.

The coupling member 21 includes a forwardly extending shaft 28 which is journalled within the cylindrical portion 20 by a pair of ball bearings 29 and 30. The shaft 28 is provided with a tapered end 31 for engagement with the complementary tapered opening 14 that functions as the power input for the drill speeder 11. The engagement of the tapered end 31 of the shaft 28 with the tapered opening 14 in the drill speeder 11 forms a drive connection for transmitting the power from the spindle 12 to the drive mechanism of the drill speeder 11.

The coupling member 21 includes a rearward portion 35 which is disposed within the bore of the spindle 12 when the unit is in operating position. The rearward portion 35 corresponds in configuration to the conventional type of tool holder which is normally inserted into the spindle 12 for carrying a cutter which is to be used in a machining operation. It is provided with a ring gear 36 that engages an internal ring gear 37 formed in the spindle 12. The meshing engagement of the ring gear 36 with the internal ring gear 37 establishes a driving connection between the spindle 12 and the coupling member 21 so that the latter will rotate with the spindle.

The adapter 12 is tightly secured within the spindle 10 by movable jaws 40 in the same manner as the conventional tool holder would be secured in operating position in the spindle 12. The jaws 40 move towards the axis of the coupling member 21 and to the right as viewed in FIG. 1, to engage a flange 41 which is formed on the rearward end of the coupling member 21 and is identical to the flange which would be carried by the conventional tool holder for the machine. The means for actuating the jaws 40 will not be described in detail inasmuch as a complete description of their operation is contained in U.S. Pat. No. 3,477,121 issued to J. L. Martin on Nov. 11, 1969.

The jaws 40 exert axial pressure on the coupling member 21 in a rearward direction, to the right as viewed in FIG. 1, to bring an annular tapered surface 45 formed on the exterior of the cylindrical portion 20 into pressure engagement with a complementary annular tapered opening 46 formed on the face plate 27. Since the tapered surface 45 is formed on the rigidly held cylindrical portion 20, the coupling member 21 is free to rotate with the spindle 12 but the engagement of the tapered surface 45 with the tapered opening 46 accurately aligns the adapter 10 with respect to the spindle 12.

The adapter 10 is provided with a tool coding structure generally identified by the reference numeral 50. The tool coding 50 serves to identify the tool adapter 10 and cooperates with a tool reader (not shown) in the tool storage magazine (not shown) for automatically identifying the adapter 10 for automatic selection in response to a signal from a suitable source, such as punched tape. Of course, the other tools in the tool storage magazine are similarly identified by a tool coding structure 50 so that any one of the tools can be selected for insertion into the spindle 12 of the machine tool.

The tool coding structure 50 and its cooperating mechanism will not be described in detail since it is not a part of the present invention and is fully described in co-pending application Ser. No. 797,812 filed Feb. 10, 1969. For the purposes of this description, suffice it to say that the tool coding structure 50 is mounted on the rear end of the adapter 10 and in order to cooperate with the tool reader (not shown) in the tool storage magazine (not shown), the tool structure 50 must be maintained in a specific angularly orientated position. The machine tool spindle 12 is arranged to always stop in the same angularly orientated position and this is accomplished by well-known means. As a result, upon the completion of its rotation, the coupling member 21 will always stop in the same angularly orientated position in which it was inserted into the spindle 12.

The cylindrical portion 20 of the adapter 10 remains fixed with respect to the frame of the machine by reason of the engagement of its key 25 in the keyway 26 formed in the spindle face plate 27. When the tool change mechanism (not shown) transfers the adapter 10 out of the spindle 12, it maintains the cylindrical portion 20 in the same angularly orientated position, and the tool storage magazine (not shown) also retains this angularly orientated position so that when the adapter 10 is returned to the machine tool spindle 12, its key 25 will be in position to again engage the keyway 26.

The coupling member 21 is retained against rotation relative to the cylindrical portion 20 during the transfer operation between the tool storage magazine (not shown) and the spindle 12, as well as while the adapter 10 is being supported in the tool storage magazine. To this end, a slidable key 55 is provided in the key 25 for cooperation with a keyway 56 formed in the coupling member 21. The key 55 is attached to an arm 60 for movement therewith along a guideway 57 formed in the key 25. A spring 61 disposed within the guideway 57 continually urges the key 55 toward the keyway 56 and the arm 60 moves with the key 55.

When the adapter 10 is inserted into the spindle 12, the arm 60 engages the front surface of the face plate 27 of the machine tool and as the adapter 10 is fully inserted into the spindle 12, the arm 60 is moved against the pressure of the spring 61 to withdraw the key 55 from the keyway 56. When the adapter 10 is fully inserted, as shown in FIG. 1, the key 55 is fully withdrawn from the keyway 56 and the coupling member 21 is now free to rotate relative to its cylindrical portion 20.

In FIG. 2, the unit is shown separated from the spindle 12 so the key 55 is within the keyway 56 to lock the coupling member 21 against rotation relative to the cylindrical portion 20. Since the spindle 12 is arranged to be orientated into a specific angular position every time it discontinues its rotation, when the rotation of the spindle 12 and the coupling member 21 secured therein is stopped, the coupling member 21 will be in the same angular position that it was when it was inserted into the spindle 12. Accordingly, the keyway 56 will be in alignment with the key 55. As the adapter 10 is withdrawn from the spindle 12, the opposing pressure on the spring 61 through the arm 60 will be relieved, and it will urge the key 55 into the keyway 56. After a short withdrawal movement, the key 55 will be forced by the spring 61 into full engagement with the keyway 56 so that the coupling member 21 will be fixed against rotation relative to the cylindrical portion 20. Since the particular angular orientation of the cylindrical portion 20 is maintained during the tool transfer operation and storage, the tool coupling member 21 will be likewise maintained in such same angularly orientated position. As a result, the tool coding 50 will be properly orientated for cooperation with the reading mechanism (not shown) which is associated with the tool storage magazine (not shown). Moreover, the next time the adapter 10 with the drill speeder 11 is returned to the spindle 12, it will be in the same angularly orientated position as it was when it was previously removed from the spindle 12.

From the foregoing detailed description of the illustrative embodiment set forth herein to exemplify the present invention, it will be apparent that there has been provided an improved adapter especially arranged to enable a conventional drill speeder to be employed in conjunction with an automatic tool change mechanism for a machine tool. The adapter of the present invention functions to secure the outer housing of the drill speeder against rotation while coupling the drive mechanism of the drill speeder for rotation by the machine tool spindle, all without any invention by the machine tool operator.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In an adapter for supporting a drill driver for actuation by a rotary machine tool spindle, said drill driver having a housing enclosing a drive mechanism which may be actuated to rotate a drill carrying spindle for rotating the drill;
   supporting means in the adapter for carrying the drill driver;
   means for securing the housing of said drill driver to prevent its rotation in said supporting means;
   a key mounted on said supporting means for engagement with a keyway formed in the frame of the machine tool to fix said supporting means against rotation relative to the machine tool frame; and
   a coupling member rotatably supported in said adapter and arranged to couple the machine tool spindle for actuating said drive mechanism so that the drill driver spindle will be rotated by the rotation of the machine tool spindle operating through said drive mechanism.

2. An adapter according to claim 1, including clamping means mounted on said supporting means and actuatable to secure said coupling member against rotation relative to said supporting member.

3. An adapter according to claim 2, including means for releasing said clamping means when said coupling member is operatively engaged to couple said spindle to the drive mechanism of the drill speeder, and to actuate said clamping mechanism for securing said coupling member against rotation when said coupling member is disengaged from said spindle.

4. In an adapter for supporting a drill speeder for actuation by a rotary machine tool spindle, said drill speeder having a housing enclosing a drive mechanism which rotates a spindle at a rate faster than the rate of rotation of the input to said drive mechanism;
   a support for carrying the drill speeder;
   means for securing the housing of said drill speeder to said support to prevent its rotation relative to said support;
   a coupling member rotatably supported by said support and extending outwardly therefrom for insertion into the machine tool spindle;
   first coupling means on said coupling members engageable with the machine tool spindle for forming a driving connection from the spindle to said coupling member when said coupling member is in said spindle; and,
   second coupling means on said coupling member engageable with the drive mechanism of the drill speeder for forming a driving connection from said coupling member to the drill speeder;
whereby when said coupling member is inserted in the machine tool spindle, it is connected to be driven by the spindle and transmits the rotation of the spindle to the drive mechanism of the drill speeder for actuating the drill speeder.

5. An adapter according to claim 4;
   wherein said support is a hollow cylinder and the drill speeder housing is secured in the bore of said cylinder.

6. An adapter according to claim 5;
   wherein the drill speeder housing is received within the forward portion of the bore of said hollow cylinder, and said coupling member is journalled in the rearward portion of the bore of said hollow cylinder.

7. An adapter according to claim 4;
   wherein said securing means comprises a key engageable with a keyway in the frame of the machine tool for securing said support and its associated drill speeder housing against rotation as the drill speeder is being actuated by the machine tool spindle.

8. An adapter according to claim 4;
   including locking means actuatable to lock said coupling member against rotation relative to said support; and, releasing means for disengaging said locking means when said coupling member is inserted into the machine tool spindle to release said coupling member for rotation relative to said support.

9. An adapter according to claim 8;
wherein said locking means comprises a key slidably carried by said support and slidable into a keyway formed in said coupling member for locking said coupling member against rotation relative to said support.

10. An adapter according to claim 9;
a spring mounted in said support to continuously urge said slidable key into engagement with its cooperating keyway in said coupling member for preventing relative rotation;
an arm attached to said slidable key in position to engage the frame of the machine tool when said coupling member is being inserted into the machine tool spindle and to move said key against the pressure of said spring out of its cooperating keyway when said coupling member is fully inserted into the spindle to release said coupling member for rotation relative to said support.

11. In a drill driver for actuation by a rotary machine tool spindle which is supported by the frame of the machine tool, said drill driver having a housing enclosing a drive mechanism which may be actuated to rotate a drill carrying spindle for rotating the drill;
a coupling member rotatable relative to said drill driver housing and adapted to be inserted into the machine tool spindle for transmitting the rotary drive from the machine tool spindle to said drill drive mechanism for rotating the drill;
means on said drill drive housing that moves into engagement with cooperating means on the frame of the machine tool when said coupling member is inserted into the machine tool spindle to fix said housing against rotation while said coupling member is being rotated by the machine tool spindle;
locking means in engagement with said housing and said coupling member to fix said coupling member against rotation relative to said housing when the drill driver is removed from the machine tool spindle; and
release means actuated by the insertion of said coupling member into the machine tool spindle to release said locking means so that said coupling member can be rotated relative to said housing.

12. A drill driver according to claim 11 wherein said locking means comprises a guideway formed in said housing;
a key slidably carried in said guideway;
a keyway formed in said coupling member to receive said key for fixing said housing and said coupling member against relative rotation;
a spring mounted in position to continuously urge said key into engagement with said keyway; and
said release means comprises an arm extending from said keyway in position to engage the frame of the machine tool and to be forced by the frame against the pressure of said spring to withdraw said key from said keyway when said coupling member is inserted into said spindle to thereby free said coupling member for rotation relative to said housing by the machine tool spindle.

* * * * *